United States Patent
Schwarte et al.

(10) Patent No.: US 6,632,915 B1
(45) Date of Patent: Oct. 14, 2003

(54) POLYURETHANES AND GRAFT MIXED POLYMERS BASED ON POLYURETHANE AND THEIR USE FOR PRODUCING COATING MATERIALS, ADHESIVES AND SEALING MASSES

(75) Inventors: Stephan Schwarte, Emsdetten (DE); Egon Wegner, Veitshöchheim (DE); Harald Angermüller, Würzburg (DE)

(73) Assignee: BASF Coatings AG, Munster (DE)

(*) Notice: Subject to any disclaimer, the term of this patent is extended or adjusted under 35 U.S.C. 154(b) by 0 days.

(21) Appl. No.: 10/088,711
(22) PCT Filed: Oct. 5, 2000
(86) PCT No.: PCT/EP00/09757
§ 371 (c)(1), (2), (4) Date: Mar. 20, 2002
(87) PCT Pub. No.: WO01/25307
PCT Pub. Date: Apr. 12, 2001

(30) Foreign Application Priority Data
Oct. 6, 1999 (DE) ......................... 199 48 004

(51) Int. Cl.⁷ ............................................. G08G 18/10
(52) U.S. Cl. .................. 528/75; 526/301; 526/302; 525/63; 525/902; 523/201; 523/501
(58) Field of Search .................. 528/75; 526/301, 526/302; 525/63, 902; 523/201, 501

(56) References Cited

U.S. PATENT DOCUMENTS

| | | | |
|---|---|---|---|
| 4,727,126 A | * | 2/1988 | Chen |
| 4,980,108 A | | 12/1990 | Suzuki et al. ............... 264/134 |
| 5,093,412 A | | 3/1992 | Mente et al. ................ 524/762 |
| 5,109,091 A | | 4/1992 | Schafheutle et al. ........ 526/301 |
| 5,691,425 A | | 11/1997 | Klein et al. ................. 525/455 |
| 6,063,861 A | | 5/2000 | Irle et al. |
| 6,162,506 A | | 12/2000 | Lettmann et al. ......... 427/407.1 |

FOREIGN PATENT DOCUMENTS

| | | | |
|---|---|---|---|
| CA | 2261232 | 9/1997 | ......... C08F/283/00 |
| CA | 2073115 | 7/2003 | ............ C08L/75/14 |
| DE | 19645761 A1 | 5/1998 | ......... C98F/283/00 |
| DE | 19722862 C1 | 1/1999 | ......... C09D/151/08 |
| EP | 472081 A1 | 8/1991 | ......... C08F/220/04 |
| EP | 510533 A2 | 4/1992 | ............ C08G/18/63 |
| EP | 0522419 A1 | 6/1992 | ............ C08G/18/67 |
| EP | 0522420 A2 | 6/1992 | ............... C07J/3/03 |
| EP | 0608021 A1 | 1/1994 | ......... C09D/151/08 |
| JP | 07292046 | 4/1994 | ......... C08F/290/06 |
| WO | WO93/24551 | 12/1993 | ............ C08G/18/42 |

OTHER PUBLICATIONS

G. Oertel; Polyurethane Handbook; 1985, pp. 19–20.*
T.J. Chen: "Preparation and polymerization of new dual active functional monomers" Polymer Material Science Eng., Bd. 57. 1987, pp. 565–569, XP000926156, p. 566.
JAPIO Abstract for JP01256512 ; Oct. 1989.

* cited by examiner

Primary Examiner—Rachel Gorr

(57) ABSTRACT

A polyurethane comprising lateral and/or terminal ethenylarylene groups produced by reacting a polyurethane prepolymer containing free isocyanate groups with an adduct obtained by reacting an ethenylarylene monoisocyanate with a polyol, polyamine, and/or a compound containing hydroxyl and amino groups in a molar ratio of 1:1. Also, a graft copolymer comprising a hydrophobic core comprising at least one monomer and a hydrophilic shell comprising the polyurethane, or a hydrophobic core comprising the polyurethane and a hydrophilic shell that comprises at least one monomer. Also, a graft copolymer comprising a hydrophobic core comprising at least one monomer and a hydrophilic shell comprising a polyurethane produced by dispersing at least one hydrophilic olefinic unsaturated polyurethane comprising lateral, and optionally terminal, ethenylarylene groups in an aqueous medium and copolymerizing at least one hydrophobic monomer in the polyurethane in emulsion.

47 Claims, No Drawings

POLYURETHANES AND GRAFT MIXED POLYMERS BASED ON POLYURETHANE AND THEIR USE FOR PRODUCING COATING MATERIALS, ADHESIVES AND SEALING MASSES

This application is a National Phase Application of Patent Application PCT/EP00/09757 filed on Oct. 5, 2000.

The present invention relates to novel polyurethanes and to novel polyurethane-based graft copolymers. The present invention also relates to novel processes for preparing polyurethanes and polyurethane-based graft copolymers. The present invention further relates to the use of the novel polyurethanes and of the novel polyurethane-based graft copolymers to prepare coating materials, adhesives, and sealing compounds. Furthermore, the present invention relates to novel coating materials, adhesives, and sealing compounds, especially aqueous coating materials, adhesives, and sealing compounds. The present invention relates not least to novel coatings, adhesive films, and seals obtainable from the novel, especially aqueous, coating materials, adhesives, and sealing compounds. In particular the present invention relates to single-coat or multicoat decorative and/or protective paint systems, especially multicoat color and/or effect paint systems.

Graft copolymers soluble or dispersible in water are known from European patent EP-A-0 608 021. They consist of a hydrophobic olefinically unsaturated polyurethane core and a hydrophilic acrylic copolymer shell with an acid number of from 30 to 120 mg KOH/g. The hydrophobic olefinically unsaturated polyurethane is prepared by reacting low molecular mass diols or polyester diols with an acid number of less than 5 mg KOH/g with diisocyanates and 1-(1-isocyanato-1-methylethyl)-3-(1-methylethenyl) benzene (dimethyl-m-isopropenylbenzyl isocyanate), which results in ethylenearylene groups, especially terminal ethylenearylene groups. Subsequently, a mixture of olefinically unsaturated monomers is polymerized in solution in the presence of the hydrophobic olefinically unsaturated polyurethane, after which the resulting graft copolymer is neutralized and dispersed in water to give a secondary dispersion. These known secondary dispersions are used for preparing clearcoat materials. Pigmented coating materials or sealing compounds and adhesives are not disclosed in EP-A-0 608 021. The specific core/shell structure comprising a hydrophobic polyurethane core and a hydrophilic polyacrylate shell means some cases prove disadvantageous here.

German patent DE-C-197 22 862 discloses a graft copolymer obtainable by polymerizing olefinically unsaturated monomers in a dispersion of an olefinically unsaturated polyurethane containing hydrophilic functional groups and having on average from 0.05 to 1.1 polymerizable double bonds per molecule. According to DE-C-197 22 862, the polyurethane main chains can be prepared using not only diisocyanates but also polyisocyanates, whose functionality is lowered by adding monoisocyanates. 1-(1-Isocyanato-1-methylethyl)-3-(1-methylethenyl)benzene is given by way of example as a monoisocyanate. Where it is used, it contributes to a certain extent to the polymerizable double bond content of the polyurethane, although the compounds envisaged for its introduction primarily comprise compounds containing isocyanate-reactive functional groups and olefinically unsaturated double bonds, such as hydroxyalkyl (meth)acrylates, for example. Owing to the mode of preparation of the polyurethane, the use of 1-(1-isocyanato-1-methylethyl)-3-(1-methylethenyl)-benzene results primarily in terminal ethylenearylene groups.

The same polyurethane and, respectively, the graft copolymer based on it are also disclosed in German patent application DE-A-196 45 761. Here again, use is made of 1-(1-isocyanato-1-methylethyl)-3-(1-methylethenyl) benzene, referred to therein as isopropenyl-alpha,alpha-dimethylbenzyl isocyanate.

The known graft copolymers of DE-C-197 22 862 and DE-A-196 45 761 are in the form of primary dispersions and are very highly suitable for preparing aqueous coating materials, especially aqueous basecoat materials. The aqueous basecoat materials may be used with advantage for the wet-on-wet technique, in which the aqueous basecoat material is applied to a primed or unprimed substrate and then the resulting aqueous basecoat film is dried without being crosslinked. Atop the dried aqueous basecoat film there is then applied a clearcoat material, after which the aqueous basecoat film and the clearcoat film are cured jointly to form a multicoat color and/or effect paint system.

In this procedure, however, when using powder slurry clearcoat materials, cracking may occur in the clearcoat on baking and/or there may be delamination of the clearcoat, particularly after condensation exposure. Furthermore, popping marks may appear.

Not least it is possible in some cases for the olefinically unsaturated group content of the polyurethanes to prove too low for complete grafting, so that a large part of the monomers to be grafted on form separate homopolymers and/or copolymers alongside the polyurethane, and can adversely affect the performance properties of the graft copolymers and of the coating materials, adhesives, and sealing compounds prepared using them.

Because of its high reactivity, the ethenylarylene group is a very good grafting site for the attachment of olefinically unsaturated monomers by polymerization. However, the introduction of these groups by way of 1-(1-isocyanato-1-methylethyl)-3-(1-methylethenyl)benzene causes problems, since owing to the steric hindrance the isocyanate group is comparatively tardy in reacting, necessitating either long reaction times and/or high reaction temperatures, both of which may lead to product damage. Moreover, this compound cannot be used easily to introduce pendant ethenylarylene groups into the polyurethanes.

It is an object of the present invention to provide novel hydrophilic and hydrophobic olefinically unsaturated polyurethanes which contain not only terminal but also pendant ethenylarylene groups, which can be prepared purposively and simply without the risk of product damage, and which constitute outstanding graft bases for olefinically unsaturated monomers.

It is a further object of the present invention to find a novel process for preparing olefinically unsaturated polyurethanes which have purposively and simply without the risk of product damage, yields hydrophilic or hydrophobic polyurethanes containing pendant and/or terminal ethenylarylene groups.

Yet another object of the present invention is to find novel graft copolymers, particularly in the form of primary dispersions, which can be prepared simply, purposively, and without risk of product damage and which in particular have a core/shell structure with a hydrophobic core formed from copolymerized monomers and with a hydrophilic shell formed from a hydrophilic polyurethane.

Still another object of the present invention is to provide novel aqueous and nonaqueous coating materials, adhesives, and sealing compounds based on polyurethane and having very good performance properties. The intention in particular is to provide novel coating materials, especially novel aqueous coating materials, specifically novel aqueous basecoat materials, which no longer have the disadvantages of the prior art but are instead outstandingly suitable for application by the wet-on-wet technique. In this context, even when using powder clearcoat slurries, there ought to be no cracking (mud cracking) in the clearcoats, delamination of the clearcoats following condensation exposure, or popping marks or pinholes. The novel coating materials ought to have a very good storage stability, outstanding application properties, such as very good leveling and very little tendency to run even at high film thicknesses, an outstanding overall appearance, and a high chemical and weathering stability.

Found accordingly has been the novel polyurethane containing at least one pendant and/or at least one terminal ethenylarylene group and preparable by
  (1) reacting at least one polyurethane prepolymer (B1) containing at least one free isocyanate group with
  (2) at least one adduct (B2) obtainable by reacting
    (2.1) at least one ethenylarylene monoisocyanate with
    (2.2) at least one polyol, polyamine and/or at least one compound containing at least one hydroxyl group and at least one amino group in a molar ratio of 1:1.

In the text below, the novel polyurethane containing at least one pendant and/or at least one terminal ethenylarylene group is referred to for the sake for brevity as "polyurethane of the invention".

Also found has been the novel graft copolymer which comprises
  A) a hydrophobic core of at least one copolymerized olefinically unsaturated monomer (a) and
  B) a hydrophilic shell which comprises or consists of at least one polyurethane (B), or
  B) a hydrophobic core which comprises or consists of at least one polyurethane (B), and
  A) a hydrophilic shell of at least one copolymerized olefinically unsaturated monomer (a)
  and which is preparable by
    1) dispersing at least one polyurethane (B) of the invention in an aqueous medium and then
    2) subjecting at least one monomer (a) to radical (co)polymerization in emulsion in the presence of the polyurethane (B) or of the polyurethanes (B).

In the text below, the novel graft copolymer based on the polyurethane of the invention is referred to as "graft copolymer 1 of the invention".

In addition there has been found the novel graft copolymer which comprises
  A) a hydrophobic core of at least one copolymerized olefinically unsaturated monomer (a) and
  B) a hydrophilic shell which comprises or consists of at least one polyurethane
  and which is preparable by
    1) dispersing at least one hydrophilic olefinically unsaturated polyurethane (B) containing at least one pendant or at least one pendant and at least one terminal ethenylarylene group in an aqueous medium and then
    2) subjecting at least one hydrophobic monomer (a) to radical (co)polymerization in emulsion in the presence of the polyurethane (B) or of the polyurethanes (B).

In the text below, the novel graft copolymer is referred to as "graft copolymer 2 of the invention".

Also found have been the novel adhesives, sealing compounds, and coating materials, especially surface coating materials and in particular aqueous surface coating materials, specifically aqueous basecoat materials, which comprise at least one polyurethane (B) of the invention, at least one graft copolymer 1 of the invention and/or at least one graft copolymer 2 of the invention and which are referred to below as adhesives, sealing compounds, and coating materials of the invention.

Found not least have been novel adhesive films, seals and coatings, especially surface coatings, which are produced by means of the adhesives, sealing compounds, and coating materials of the invention and which are referred to below as adhesive films, seals, and coatings of the invention.

Also found, in addition, have been novel substrates which comprise at least one adhesive film, seal and/or coating of the invention and are referred to below as substrates of the invention.

In the light of the prior art it was surprising and unforeseeable for the skilled worker that the complex problem on which the present invention was based could be solved by means of the polyurethanes (B) of the invention, the graft copolymers 1 of the invention and/or the graft copolymers 2 of the invention. A particular surprise was that the polyurethanes (B) of the invention, the graft copolymers 1 of the invention and the graft copolymers 2 of the invention could be prepared simply and purposively without any damage to the products of the invention. Yet another surprise was the extremely broad usefulness of the polyurethane (B) of the invention and of the graft copolymers 1 and 2 of the invention. Completely impossible to foresee was that, in particular, the graft copolymers 1 and 2 of the invention with a hydrophobic core (A) and a hydrophilic shell (B) would give aqueous basecoat materials which can be processed with powder clearcoat slurries by the wet-on-wet technique to give outstanding multicoat color and/or effect paint systems, or that there would be cracking (mud cracking) in the clearcoats, delamination of the clearcoats following condensation exposure, or popping marks or pinholes.

In the context of the present invention, the property of hydrophilicity denotes the constitutional property of a molecule or functional group to penetrate into the aqueous phase or to remain therein.

Accordingly, in the context of the present invention, the property of hydrophobicity denotes the constitutional property of a molecule or functional group to behave exophilically with respect to water, i.e., to tend not to penetrate into water or to tend to depart the aqueous phase.

For further details, refer to Römpp Lexikon Lacke und Druckfarben, Georg Thieme Verlag, Stuttgart, N.Y., 1998, "Hydrophilicity", "Hydrophobicity", pages 294 and 295.

The polyurethane (B) of the invention comprises at least one pendant and/or at least one terminal ethenylarylene group. Alternatively expressed, the polyurethane (B) of the invention comprises at least one pendant, at least one terminal, or at least one pendant and at least one terminal ethenylarylene group. In this context, the polyurethanes (B) of the invention which comprise at least one pendant ethenylarylene group afford particular advantages and are therefore particularly preferred in accordance with the invention.

The polyurethane (B) of the invention is hydrophobic or hydrophilic in the above-mentioned sense. In terms of their use to prepare the graft copolymers 1 of the invention, the hydrophilic polyurethanes (B) of the invention afford advantages and are therefore used with preference.

The polyurethane (B) of the invention is obtainable by preparing, in a first process step, a polyurethane prepolymer (B1) that contains at least one free isocyanate group.

The polyurethane prepolymer (B1) is of linear, branched or comb, but especially linear, construction. In this context the linear polyurethane prepolymer (B1) includes preferably two free isocyanate groups, especially two terminal free isocyanate groups. The branched or comb-constructed polyurethane prepolymers (B1) include preferably at least two, in particular more than two, free isocyanate groups, terminal free isocyanate groups being preferred.

Viewed in terms of method, the preparation of the polyurethane prepolymers (B1) for use in accordance with the invention has no special features but instead takes place, for example, as described in patents DE-C-197 22 862, DE-A-196 45 761, EP-A-0 522 419 or EP-A-0 522 420, by reaction of a polyol, especially a diol, with at least one polyisocyanate, especially a diisocyanate, the isocyanate component being employed in a molar excess.

For the preparation of the polyurethane prepolymers (B1) it is preferred to use diisocyanates and also, if desired, in minor amounts, polyisocyanates, for the purpose of introducing branches. In the context of the present invention, minor amounts are amounts which do not cause gelling of the polyurethane prepolymers (B1) during their preparation. This may also be prevented by using small amounts of monoisocyanates as well.

Examples of suitable diisocyanates are isophorone diisocyanate (i.e., 5-isocyanato-1-isocyanatomethyl-1,3,3-trimethylcyclohexane), 5-iso-25 cyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in patents DO 97/49745 and WO 97/49747, especially 2-heptyl-3,4-bis(9-isocyanatononyl)-1-pentylcyclohexane, or 1,2-, 1,4- or 1,3-bis (isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl) cyclohexane, liquid bis(4-isocyanatocyclohexyl)methane with a trans/trans content of up to 30% by weight, preferably 25% by weight, and in particular 20% by weight, as is described in patents DE-A-44 14 032, GB-A-1220717, DE-A-16 18 795 or DE-A-17 93 785; tolylene diisocyanate, xylylene diisocyanate, bisphenylene diisocyanate, naphthylene diisocyanate or diphenylmethane diisocyanate.

Examples of suitable polyisocyanates are the isocyanurates of the diisocyanates described above.

Examples of highly suitable monoisocyanates are phenyl isocyanate, cyclohexyl isocyanate or stearyl isocyanate.

The polyurethane prepolymers (B1) are also prepared using
    saturated and unsaturated polyols of relatively high and low molecular mass, especially diols and, in minor amounts, triols for the purpose of introducing branches, and also, if desired,
    compounds which introduce hydrophilic functional groups,
    polyamines, and
    amino alcohols.

Examples of suitable polyols are saturated or olefinically unsaturated polyester polyols which are prepared by reacting
    unsulfonated or sulfonated saturated and/or unsaturated polycarboxylic acids or their esterifiable derivatives, alone or together with monocarboxylic acids, and
    saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also known as dimeric fatty acids.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, fatty acids of naturally occurring oils, acrylic acid, methacrylic acid, ethacrylic acid or crotonic acid. A preferred monocarboxylic acid used is isononanoic acid.

Examples of suitable polyols are diols and triols, especially diols. Normally, triols are used alongside the diols in minor amounts in order to introduce branches into the polyester polyols. In the context of the present invention, minor amounts are amounts which do not cause gelling of the polyester polyols during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols.

These diols may also be used per se for the preparation of the polyurethanes (A) for use in accordance with the invention.

Further examples of suitable diols are diols of the formula IV or V:

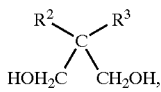
(IV)

where $R^2$ and $R^3$ are each an identical or different radical and are an alkyl radical having 1 to 18 carbon atoms, an aryl radical or a cycloaliphatic radical, with the proviso that $R^2$ and/or $R^3$ must not be methyl;

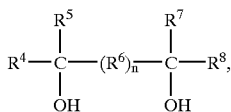
(V)

where $R^4$, $R^5$ $R^7$ and $R^8$ are each identical or different radicals and are an alkyl radical having 1 to 6 carbon atoms, a cycloalkyl radical or an aryl radical and $R^6$ is an alkanediyl radical having 1 to 6 carbon atoms, an arylene radical or an unsaturated alkenediyl radical having 1 to 6 carbon atoms, and n is either 0 or 1.

Suitable diols IV of the general formula IV are all propanediols of the formula in which either $R^2$ or $R^3$, or $R^2$ and $R^3$ is or are not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol or 2-cyclohexyl-2-methyl-1,3-propanediol, et cetera.

Examples of diols V of the general formula V that may be used are 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'-hydroxypropyl)benzene.

Of these diols, hexanediol and neopentyl glycol are particularly advantageous and are therefore used with particular preference.

The abovementioned diols may also be used per se to prepare the polyurethane prepolymers (B1).

Examples of suitable triols are trimethylolethane, trimethylolpropane or glycerol, especially trimethylolpropane.

The abovementioned triols may also be used per se to prepare the polyurethane prepolymers (B1) (cf. patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyester polyols may be prepared in the presence of small amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols are polyester diols which are obtained by reacting a lactone with a diol. They are notable for the presence of terminal hydroxyl groups and repeating polyester fractions of the formula —(—CO—$(CHR^9)_m$—$CH_2$—O—)—. Here, the index m is preferably from 4 to 6 and the substituent $R^9$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for the preparation of the polyester diols is the unsubstituted ε-caprolactone, where m is 4 and all substituents $R^9$ are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactam diols, which are prepared by reacting, for example, ε-caprolactam with low molecular mass diols.

Further examples of suitable polyols include polyether polyols, especially those having a number-average molecular weight of from 400 to 5000, in particular from 400 to 3000. Examples of highly suitable polyether diols are polyether diols of the general formula H—(—O—$(CHR^{10})_o$—$)_p$ OH, where the substituent $R^{10}$ is hydrogen or a lower, unsubstituted or substitued alkyl radical, the index o is from 2 to 6, preferably from 3 to 4, and the index p is from 2 to 100, preferably from 5 to 50. Especially suitable examples are linear or branched polyether diols such as poly(oxyethylene) glycols, poly(oxypropylene)glycols, and poly(oxybutylene)glycols.

By means of the polyether diols it is possible to introduce nonionic hydrophilic functional groups b3) into the main chain(s) of the polyurethane prepolymers (B1).

Hydrophilic polyurethane prepolymers (B1) comprise alternatively (b1) hydrophilic functional groups convertible into cations by neutralizing agents and/or quaternizing agents, and/or cationic groups, especially ammonium groups, or (b2) functional groups convertible into anions by neutralizing agents, and/or anionic groups, especially carboxylic acid and/or carboxylate groups, and/or (b3) nonionic hydrophilic groups, especially poly(alkylene ether) groups.

Examples of suitable functional groups (b1) for use in accordance with the invention and convertible into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (b1) for use in accordance with the invention are primary, secondary, tertiary or quaternary ammonium groups, tertiary sulfonium groups or quaternary phosphonium groups, preferably quaternary ammonium groups or quaternary ammonium groups, tertiary sulfonium groups, but especially tertiary sulfonium groups.

Examples of suitable functional groups (b2) for use in accordance with the invention and convertible into anions by neutralizing agents are carboxylic acid, sulfonic acid or phosphonic acid groups, especially carboxylic acid groups.

Examples of suitable anionic groups (b2) for use in accordance with the invention are carboxylate, sulfonate or phosphonate groups, especially carboxylate groups.

Examples of suitable neutralizing agents for functional groups (b1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (b2) convertible into anions are tertiary amines, such as trimethylamine, triethylamine, tributylamine, dimethylaniline, diethylaniline, triphenylamine, dimethylethanolamine, diethylethanolamine, methyldiethanolamine, or triethanolamine, for example. Neutralization may take place in organic phase or in aqueous phase. A preferred neutralizing agent used is dimethylethanolamine.

The introduction of hydrophilic functional (potential) cationic groups (b1) into the polyurethane prepolymers (B1) takes place by way of the incorporation of compounds which contain in the molecule at least one, especially two, isocyanate-reactive groups and at least one group capable of forming cations; the amount to be used may be calculated from the target amine number.

Suitable isocyanate-reactive groups are, in particular, hydroxyl groups and also primary and/or secondary amino groups, of which the hydroxyl groups are preferably used.

Examples of suitable compounds of this kind are 2,2-dimethylolethyl- or -propylamine blocked with a ketone, the resultant ketoxime group being hydrolyzed again prior to the formation of the cationic group (b1), or N,N-dimethyl-, N,N-diethyl- or N-methyl-N-ethyl-2,2-dimethylolethyl- or -propylamine.

The introduction of hydrophilic functional (potentially) anionic groups (b2) into the polyurethane prepolymers (B1) takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Suitable isocyanate-reactive groups are in particular hydroxyl groups, and primary and/or secondary amino groups. Accordingly it is possible, for example, to use alkanoic acids having two substituents on the α-carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic. acid. A particularly preferred group of alkanoic acids are the α,α-dimethylolalkanoic acids of the general formula $R^{11}$—$C(CH_2OH)_2COOH$, $R^{11}$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimenthylolpentanoic acid. The preferred dihydroxyalkanoic acid is 2,2-dimethylolpropionic acid. Examples of compounds containing amino groups are α,δ-diaminovaleric acid, 3,4-diaminobenzoic acid, 2,4-diaminotoluenesulfonic acid, and 2,4-diaminodiphenyl ether sulfonic acid.

Hydrophilic functional nonionic poly(oxylkylene) groups (b3) may be introduced as lateral or terminal groups into the polyurethane molecules. For this purpose it is possible to use not only the above-described polyether diols but also, for example, alkoxypoly(oxyalkylene) alcohols having the general formula $R^{12}O$—(—$CH_2$—$CHR^{13}$—O—)$_r$H, where $R^{12}$ is an alkyl radical having 1 to 6 carbon atoms, $R^{13}$ is a hydrogen atom or an alkyl radical having 1 to 6 carbon atoms, and the index r is a number between 20 and 75 (cf. patents EP-A-0 354 261 or EP-A-0 424 705).

The hydrophilic functional groups (b1) or (b2) are to be selected so as to rule out the possibility of any disruptive reactions, such as, for instance, salt formation or crosslinking with the functional groups that may be present in the other constituents of the polyurethane (B) of the invention, of the graft copolymers 1 of the invention, of the coating material of the invention, of the sealing compound of the invention, or of the adhesive of the invention. The skilled worker will therefore be able to make the selection in a simple manner on the basis of his or her knowledge in the art.

Of these hydrophilic functional (potentially) ionic groups (b1) and (b2) and the hydrophilic functional nonionic groups (b3), the (potentially) anionic groups (b2) are advantageous and are therefore used with particular preference.

To prepare the hydrophilic and the hydrophobic polyurethane prepolymers (B1) it is possible to use polyamines and amino alcohols which bring about an increase in the molecular weight of the polyurethane prepolymers (B1). The essential point in this context is that the polyamines and amino alcohols are employed in an amount such that there are still free isocyanate groups remaining in the molecule.

Examples of suitable polyamines have at least two primary and/or secondary amino groups. Polyamines are essentially alkylene polyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,41-diaminodicyclohexylmethane, and aminoethylenothanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine is ethylhexylamine (cf. patent EP-A-0 089 497).

Examples of suitable amino alcohols are ethanolamine or diethanolamine.

Furthermore, to prepare the hydrophilic and hydrophobic polyurethane prepolymers (B1) it is possible to use customary and known compounds by means of which olefinically unsaturated groups are introduced. As is known, such compounds contain at least two isocyanate-reactive functional groups, especially hydroxyl groups, and at least one olefinically unsaturated group. Examples of suitable compounds of this kind are known from patents DE-C-197 22 862, DE-A-196 45 761, EP-A-0 522 419 or EP-A-0 522 420.

Preparation of the polyurethanes (B) of the invention comprises, in a second process step, preparing at least one adduct (B2).

The adduct (B2) for inventive use is obtainable by reacting at least one ethenylarylene monoisocyanate with at least one polyol, polyamine and/or at least one compound containing at least one hydroxyl group and at least one amino group, in a molar ratio of 1:1.

Inventively preferred ethenylarylene onoisocyanates are those of the general formula I

$$CH_2=C(R)-A-X-NCO \qquad (I)$$

in which the variables have the following meanings:

A=substituted or unsubstituted $C_6$–$C_{20}$ arylene radical;

R=hydrogen atom, a halogen atom, a nitrile group, a substituted or unsubstituted alkyl, cycloalkyl, alkylcycloalkyl, cycloalkylalkyl, aryl, alkylaryl, cycloalkylaryl arylalkyl or arylcycloalkyl radical; and X=divalent organic radical.

Examples of suitable arylene radicals A are 1,2-, 1,3- or 1,4-phenylene, 1,2-, 1,3-, 1,4-, 1,5-, 1,6-, 1,7-, 1,8-, 2,3-, 2,4-, 2,5-, 2,6- or 2,7-naphthylene, 1,2'-, 1,3'-, 1,4'-, 2,2'-, 2,3'-, 2,4'- or 2,5 -biphenylylene or 1,4-phenanthrenylene.

Of these, the phenylene, naphthylene and biphenylylene radicals A are of advantage and are therefore used with preference in accordance with the invention. Particular advantages are afforded by the phenylene radicals A, especially the 1,3-phenylene radical A, which accordingly is used with very particular preference in accordance with the invention.

Examples of suitable alkyl radicals R are ethyl, ethyl, propyl, isopropyl, n-butyl, iso-butyl, ert-butyl, amyl, hexyl, heptyl, octyl, 2-ethylhexyl, sooctyl, nonyl, decyl, undecyl, dodecyl, tridecyl, tetradecyl, pentadecyl, hexadecyl, heptadecyl, octadecyl, nonadecyl or eicosanyl.

Examples of suitable cycloalkyl radicals R are cyclobutyl, cyclopentyl, cyclobutyl, cyclopentyl, cyclohexyl, bicyclo[2.2.1]heptayl, bicyclo[3.2.1]octyl or tricyclodecyl.

Examples of suitable alkylcycloalkyl radicals R are methylenecyclohexane, ethylenecyclohexane or propane-1, 3-diyl-cyclohexane.

Examples of suitable cycloalkylalkyl radicals R are 2-, 3- or 4-methyl-, -ethyl-, -propyl- or -butylcyclohex-1-yl.

Examples of suitable aryl radicals R are phenyl, naphthyl or biphenylyl.

Examples of suitable alkylaryl radicals R are benzyl-, ethylene- or propane-1,3-diyl-benzene.

Examples of suitable cycloalkylaryl radicals R are 2-, 3-, or 4-phenylcyclohex-1-yl.

Examples of suitable arylalkyl radicals R are 2-, 3- or 4-methyl-, -ethyl-, -propyl- or -butylphen-1-yl.

Examples of suitable arylcycloalkyl radicals R are 2-, 3- or 4-cyclohexylphen-1-yl.

Of these radicals R, hydrogen atoms and alkyl groups R, especially methyl groups, are of advantage and are therefore used with preference in accordance with the invention. Of particular advantage in terms of the grafting activity of the ethenyl group are hydrogen atoms, which are therefore used with very particular preference in accordance with the invention.

The radicals A and R described above, where they are not hydrogen atoms, halogen atoms or nitrile groups, may be substituted. For this purpose it is possible to use electron withdrawing or electron donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; and tertiary amino groups, especially N,N-dimethylamino, N,N-diethylamino, N,N-dipropylamino, N,N-diphenylamino, N,N-dicyclohexylamino, N-cyclohexyl-N-methylamino or N-ethyl-N-methylamino. Suitable substituents are to be selected such that any unwanted interaction such as salt formation or crosslinking with the hydrophilic groups that may be present in the polyurethane (B) of the invention or present in the graft copolymers 1 and 2 of the invention cannot take place. The skilled worker is therefore able to select suitable substituents in a simple manner.

In accordance with the invention, unsubstituted radicals A and R are of advantage and are therefore used with particular preference.

In the general formula I, the variable X stands for a divalent organic radical which derives from the following compounds:

(i) substituted and unsubstituted, linear or branched alkanes, alkenes, cycloalkanes, cycloalkenes, alkylcycloalkanes, alkylcycloalkenes, alkenylcycloalkanes or alkenylcycloalkenes containing no heteroatom or at least one heteroatom in the chain and/or in the ring;

(ii) substituted and unsubstituted aromatics or heteroaromatics; and (iii) alkyl-, alkenyl-, cycloalkyl-, cycloalkenyl-, alkylcycloalkyl-, alkylcycloalkenyl-, alkenylcycloalkyl- or alkenylcycloalkenyl-substituted aromatics or heteroaromatics whose substituents are substituted or unsubstituted and contain no heteroatom or at least one heteroatom in their chain and/or their ring;

Examples of suitable heteroatoms are oxygen, nitrogen, boron, silicon, sulfur or phosphorus atoms.

Examples of suitable substituents are the substituents mentioned above, for whose selection the comments made above are to be observed.

Examples of suitable aromatics are benzene and naphthalene.

Examples of suitable heteroaromatics are thiophene, pyridine or triazine.

Examples of suitable alkanes are branched or unbranched alkanes having from 1 to 10, in particular from 3 to 6, carbon atoms in the molecule such as methane ethane, propane, butane, isobutane, pentane, neopentane, hexane, heptane, octane, isooctane, nonane or dececane.

Examples of suitable alkenes are ethylene and propylene.

Examples of suitable cycloalkanes are cyclopentane and cyclohexane.

Examples of suitable cycloalkenes are cyclopentene and cyclohexene.

Examples of suitable alkylcycloalkanes are methylcyclopentane and methylcyclohexane.

Examples of suitable alkylcycloalkenes are methylcyclopentene and methylcyclohexene.

Examples of suitable alkenylcycloalkanes are allyl- and vinylcyclopentane and allyl- and vinylcyclohexane.

Examples of suitable alkenylcycloalkenes are vinylcyclopentene and vinylcyclohexene.

Examples of suitable alkyl, alkenyl, cycloalkyl, cycloalkenyl, alkylcycloalkyl, alkylcycloalkenyl, alkenylcycloalkyl or alkenylcycloalkenyl substituents are methyl, ethyl, propyl, isopropyl, n-butyl, sec-butyl, tert-butyl, vinyl, allyl, cyclohexyl, cyclohexenyl, 4-methylcyclohexyl, 4-methylcyclohexenyl, 3-allylcyclohexenyl or 4-vinylcyclohexenyl.

The radicals X preferably derive from organic compounds which per se are unsubstituted or whose substituents are unsubstituted.

With particular preference the radicals X are alkanediyl radicals having from 3 to 6 carbon atoms in the molecule, especially the alkanediyl radical —C(CH$_3$)$_2$—.

Among the ethenylarylene monoisocyanates I, 1-(1-isocyanato-1-methylethyl)-3-(1-methylethenyl)benzene has very particular advantages in terms of reaction to give the desired adduct (B2) and in terms of the grafting activity of the polyurethanes (B) of the invention and is therefore used with very particular preference in accordance with the invention.

1-(1-Isocyanato-1-methylethyl)-3-(1-methylethenyl) benzene is a known compound and is available under the brand name TMI® from the company CYTEC.

Examples of suitable polyols, polyamines and compounds containing at least one hydroxyl group and at least one amino group are the compounds described above in connection with the description of the polyurethane prepolymer (B1).

Of these compounds, ethanolamine and diethanolamine offer very particular advantages and are therefore used with very particular preference in accordance with the invention. When using ethanolamine this results in an adduct (B2) which contains one isocyanate-reactive functional group and one urethane group or one urea group. When using diethanolamine an adduct (B2) results which contains two isocyanate-reactive functional groups and one urethane group or one urea group. This difunctional adduct (B2) is outstandingly suitable for preparing pendant ethenylarylene groups. At the same time, an increase in the molecular weight of the polyurethanes (B) of the invention can be achieved by this means.

The preparation of the adducts (B2) for use in accordance with the invention has no special features in terms of its method but instead takes place by the reaction of the above-described starting products in an inert organic medium, preferably in polar organic solvents such as ketones, especially methyl ethyl ketone, or amides, especially N-methylpyrrolidone, which contain no functional groups which react with isocyanate groups. It is important that the reaction takes place until free isocyanate groups can no longer be detected in the reaction mixture.

The preparation of the polyurethanes (B) of the invention from the above-described polyurethane repolymers (B1) and from the adducts (B2) likewise has o special features in terms of its method but instead takes place without solvent or in an inert organic medium, preferably in an inert organic medium, in which context the polar organic solvents described above are employed with preference. It is important that the reaction takes place until free isocyanate groups can no longer be detected in the reaction mixture.

The ethenylarylene group content of the polyurethanes (B) of the invention may vary very widely. It is preferably from 0.01 to 30%, more preferably from 0.1 to 25%, with particular preference from 0.2 to 20%, with very particular preference from 0.25 to 15%, and in particular from 0.3 to 10% by weight, based in each case on the polyurethane (B) of the invention.

Particularly advantageous hydrophilic or hydrophobic polyurethanes (B) of the invention here contain on average per molecule at least one, preferably at least two and in particular at least three pendant, at least one, preferably at least two and in particular at least three terminal, or at least one pendant and at least one terminal, preferably at least one pendant and at least two terminal, more preferably at least two pendant and at least one terminal ethenylarylene groups of the general formula II:

$$CH_2=C(R)—A—$$  (II).

In the general formula II, the variables R and A have the meanings detailed above.

In accordance with the invention, the ethenylarylene groups of the general formula II are joined to the polyurethane main chain by way of a linking radical III. This linking radical III is a divalent or trivalent radical.

Examples of highly suitable linking radicals III are those of the general formula IIIa to IIIc:

$$—X—NH—C(O)—O—$$  (IIIa), $$—X—NH—C(O)—NH—$$  (IIIb) or $$—X—NH—C(O)—N<$$  (IIIc).

In these formulae, the variable X has the meaning detailed above in connection with the general formula I. With particular preference the linking radical IIIc serves for linking the pendant ethenylarylene groups I to the polymer main chain, with the tertiary nitrogen atom being part of the polymer main chain.

The polyurethanes (B) of the invention may be used per se for preparing coating materials, especially surface coating materials, adhesives, and sealing compounds.

Where the polyurethanes (B) of the invention are hydrophilic, it is of advantage in accordance with the invention to use them in the form of a dispersion in an aqueous medium. The aqueous medium contains essentially water. The aqueous medium may include minor amounts of organic solvents, neutralizing agents, crosslinking agents and/or customary coatings additives and/or other dissolved solid, liquid or gaseous, organic and/or inorganic, low and/or high molecular mass substances. In the context of the present invention, the term "minor amount" refers to an amount which does not take away the aqueous nature of the aqueous medium. The aqueous medium may alternatively comprise straight water.

For the purpose of dispersion, the hydrophilic polyurethanes (B) of the invention which contain the above-described (potentially) ionic hydrophilic functional groups (b1) or (b2) are neutralized with at least one of the above-described neutralizing agents and then dispersed. In the case of the hydrophilic polyurethanes (B) of the invention which contain only the nonionic hydrophilic functional groups (b3), the use of neutralizing agents is unnecessary.

The resultant polyurethane dispersions (B) of the invention are likewise outstandingly suitable for preparing aqueous coating materials, adhesives, and sealing compounds. They are particularly suitable for preparing the graft copolymers 1 or 2 of the invention.

The graft copolymers 1 of the invention comprise a hydrophobic core (A) of at least one copolymerized olefinically unsaturated monomer (a) and a hydrophilic shell (B) which consists of or comprises at least one hydrophilic polyurethane (B) of the invention. This variant of the graft copolymers 1 of the invention is prepared by dispersing at least one hydrophilic polyurethane (B) of the invention in an aqueous medium, after which at least one hydrophobic olefinically unsaturated monomer (a) is radically (co) polymerized in emulsion in its presence.

The second variant of the graft copolymers 1 of the invention comprises a hydrophobic core (B) which comprises at least one hydrophobic polyurethane (B) of the invention and a hydrophilic shell (A) containing in copolymerized form at least one hydrophilic olefinically unsaturated monomer (a). This second variant is prepared by dispersing at least one hydrophobic polyurethane (B) of the invention in an aqueous medium. Advantageously, this is carried out within a strong shear field. Viewed in terms of its method, this process has no special features but can instead take place, for example, in accordance with the dispersion processes described in European patent application EP-A-0 401 565. Thereafter, at least one hydrophilic olefinically unsaturated monomer (a) is (co)polymerized in the presence of the dispersed ydrophobic polyurethanes (B) of the invention.

Like the first variant of the graft copolymers 1 of the invention, the graft copolymers 2 of the invention comprise a hydrophobic core (A) of at least one copolymerized olefinically unsaturated monomer (a) and a hydrophilic shell (B) which comprises or consists of at least one hydrophilic polyurethane (B) of the invention. The graft copolymers 2 of the invention are likewise prepared by dispersing at least one hydrophilic, polyurethane (B) of the invention in an aqueous medium, after which at least one hydrophobic olefinically unsaturated monomer (a) is radically (co)polymerized in emulsion in its presence. Essential for the graft copolymer 2 of the invention is that the hydrophilic polyurethane (B) of the invention from which it is prepared mandatorily contains at least one pendant, or at least one pendant and at least one terminal, ethenylarylene group.

Moreover, unlike the graft copolymers 1 of the invention, the graft copolymers 2 of the invention can be prepared using not only the hydrophilic polyurethanes (B) of the invention described in detail above but also polyurethanes (B') which result from the reaction of hydrophilic oligomers or polymers with the ethenylarylene monoisocyanates I described in detail above.

Suitable hydrophilic oligomers or polymers contain at least two hydroxyl groups or at least two amino groups or at least one hydroxyl group and at least one amino group, but in particular at least one pendant and at least one terminal hydroxyl group.

In the context of the present invention, oligomers are resins which contain at least 2 to 15 repeating monomer units in their molecule. In the context of the present invention, polymers are resins which contain at least 10 repeating monomer units in their molecule. For further details of these terms, refer to Römpp Lexikon Lacke und Druckfarben, Georg Thieme Verlag, Stuttgart, N.Y., 1998, "oligomersn", page 425.

The hydrophilic oligomers or polymers may come from any desired oligomer or polymer classes and may constitute random, alternating and/or block linear and/or branched and/or comb addition (co)polymers of ethylenically unsaturated monomers or polyaddition resins and/or polycondensation resins. For further details of these terms, refer to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation" and "polycondensation resins".

Examples of highly suitable addition (co)polymers are poly(meth)acrylates and partially saponified polyvinyl esters.

Examples of highly suitable polyaddition resins and/or polycondensation resins are polyesters, alkyds, polyurethanes, polylactones, polycarbonates, polyethers, epoxy resin-amine adducts, polyureas, polyamides or polyimides.

With particular preference, hydroxyl-containing polyesters or polyurethanes are used as hydrophilic oligomers and polymers.

Examples of suitable hydroxyl-containing polyurethanes are customary and known. They are prepared using the starting products described above in connection with the preparation of the polyurethane prepolymers (B1) containing isocyanate groups, except that a molar excess of polyol components over the polyisocyanates is employed, so that hydroxyl end groups instead of isocyanate end groups result.

Similarly, examples of suitable hydroxyl-containing polyesters are customary and known. They are prepared using the starting products described above in connection with the preparation of the polyester polyols. Further examples of suitable polyesters are known from patent EP-A-0 608 021.

The reaction of the hydrophilic oligomers and polymers with the ethenarylene monoisocyanates I likewise has no special features in terms of its method but instead takes place under the conditions such as are normally employed in the reaction of hydroxyl-containing compounds with isocyanates.

Examples of hydrophilic and hydrophobic monomers (a) suitable for preparing the graft copolymers 1 or 2 of the invention are the following:

Monomers (a1)

Hydroxyalkyl esters of acrylic acid, methacrylic acid or another alpha,beta-ethylenically unsaturated carboxylic acid which are derived from an alkylene glycol which is esterified with the acid, or are obtainable by reacting the acid with alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl) cyclohexane, octahydro-4,7-methano-1H-indenedimethanol or methylpropanediol monoacrylate, monomethacrylate, monoethacrylate or monocrotonate; or reaction products of cyclic esters, such as ε-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. These monomers (a1) of higher functionality are generally used only in minor amounts. In the context of the present invention, minor amounts of higher-functional monomers here are amounts which do not result in the crosslinking or gelling of the polyacrylate resins. Thus, the proportion of trimethylolpropane monoallyl ether may be from 2 to 10% by weight, based on the overall weight of the monomers (a1) to (a6) used to prepare the polyacrylate resin.

Monomers (a2)

(Meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of higher-functional monomers (a2) here are amounts which do not cause crosslinking or gelling of the polyacrylate resins.

Monomers (a3)

Ethylenically unsaturated monomers which carry at least one acid group, preferably a carboxyl group, per molecule, or a mixture of such monomers. As component (a3) it is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (a3). Further suitable monomers (a3) include mono(meth)acryloyl-oxyethyl maleate, succinate, and phthalate.

Monomers (a4)

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefins with formic acid and/or with carbon monoxide and water, a mixture of carboxylic acids is formed in which the carboxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids, for example, by reacting the acid with acetylene. Particular preference—owing to their ready availability—is given to the use of vinyl esters of saturated aliphatic monocarboxylic acids having 9 to 11 carbon atoms and being branched on the alpha carbon atom.

Monomers (a5)

Reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic® acid. This glycidyl ester is obtainable commercially under the name Cardura® E10. For further details, reference is made to Römpp Lexikon Lacke und Druckfarben, Georg Thieme Verlag, Stuttgart, N.Y., 1998, pages 605 and 606.

Monomers (a6)

Ethylenically unsaturated monomers substantially free from acid groups, such as olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene, arylstyrenes, in particular diphenylethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, refer to Römpp Lexikon Lacke und Druckfarben, Georg Thieme Verlag, Stuttgart, N.Y., 1998, page 598 and also pages 605 and 606), and/or the vinyl ester of 2-methyl-2-ethylheptanoic acid; and/or polysiloxane macromonomers having a number-average molecular weight Mn of from 1000 to 40,000, preferably from 2000 to 20,000, with particular preference from 2500 to 10,000, and in particular from 3000 to 7000, and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in international patent application WO 92/22615 on page 12 line 18 to page 18 line 10, or acryloxysilane-containing vinyl monomers, preparable by reacting hydroxy-functional silanes with epichlorohydrin and then reacting the reaction product with methacrylic acid and/or hydroxyalkyl esters of (meth)acrylic acid.

From these suitable monomers (a) described above by way of example, the skilled worker is easily able to select, on the basis of their known physicochemical properties and reactivities, the hydrophilic or hydrophobic monomers (a) that are particularly suitable for the intended use in question. If desired, he or she may for this purpose conduct a few preliminary rangefinding experiments. In particular, he or she will be careful to ensure that the monomers (a) contain no functional groups, especially (potentially) ionic functional groups, which enter into unwanted interactions with the (potentially) ionic functional groups in the hydrophilic polyurethanes (B) of the invention.

In accordance with the invention, particular advantages result if the monomers (a) are selected such that the profile of properties of the grafted-on (co)polymers is determined essentially by the above-described hydrophilic or hydrophobic (meth)acrylate monomers (a), the other monomers (a) advantageously providing broad variation of this profile of properties.

In accordance with the invention, very particular advantages result from using mixtures of the monomers (a1), (a2) and (a6) and also, if desired, (a3).

Viewed in terms of method, the preparation of the graft copolymers 1 or 2 of the invention has no special features but instead takes place in accordance with the customary and known methods of radical emulsion polymerization in the presence of at least one polymerization initiator, such as is described, for example, in patents DE-C-197 22 862, DE-A-196 45 761, EP-A-0 522 419 or EP-A-0 522 420.

Examples of suitable polymerization initiators are initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate, or tert-butyl per-2-ethylhexanoate; potassium, sodium or ammonium peroxodisulfate; azo dinitriles such as azobisisobutyronitrile; C—C-cleaving initiators such as benzpinacol silyl ethers; or a combination of a nonoxidizing initiator with hydrogen peroxide. The initiators are used preferably in an amount of from 1 to 25% by weight, with particular preference from 2 to 10% by weight, based on the overall weight of the monomers (a).

The polymerization is appropriately conducted at a temperature of from 80 to 200° C., preferably from 110 to 180° C.

It is preferred to commence the addition of initiator some time, generally for about 1 to 15 minutes, before the addition of the monomers. Preference is further given to a process in which the addition of initiator is commenced at the same point in time as the addition of the monomers and is ended about half an hour after the addition of the monomers has been ended. The initiator is preferably added in a constant amount per unit time. After the end of the addition of initiator, the reaction mixture is held at polymerization temperature until (generally 1.5 hours) all of the monomers used have undergone substantially complete reaction. "Substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Suitable reactors for the graft copolymerization include the customary and known stirred tanks, stirred tank cascades, tube reactors, loop reactors or Taylor reactors, as are described, for example, in patents DE-B-1 071 241 or EP-A-0 498 583 or in the article by K. Kataoka in Chemical Engineering Science, Volume 50, No. 9, 1995, pages 1409 to 1416.

The quantitative ratio of core to shell in the graft copolymers 1 and 2 of the invention may vary extremely widely, which is a particular advantage of the graft copolymers of the invention. Preferably this ratio is from 1:100 to 100:1, more preferably from 1:50 to 50:1, with particular preference from 30:1 to 1:30, with very particular preference from 20:1 to 1:20, and in particular from 10:1 to 1:10. Very particular advantages result if this ratio is approximately 1.5:1 to 1:1.5, in particular 1.2:1 to 1:1.2.

In the case of the inventively preferred use of (potentially) anionic hydrophilic functional groups (b2), especially carboxylic acid groups, further particular advantages result if in the graft copolymers 1 and 2 of the invention the ratio of acid number of the shell to acid number of the core is >1, preferably >3, more preferably >5, with particular preference >7, with very particular preference >9, and in particular >10.

The graft copolymers 1 and 2 of the invention may be isolated from the primary dispersions in which they are produced and may be passed on for a very wide variety of end uses, especially in solventborne, water- and solvent-free pulverulent solid or water- and solvent-free liquid coating materials, adhesives, and sealing compounds. In accordance with the invention, however, it is of advantage to use the primary dispersions as such to prepare aqueous coating materials, adhesives, and sealing compounds.

In addition to the polyurethanes (B) of the invention and the graft copolymers 1 or 2 of the invention, the aqueous adhesives of the invention may comprise further suitable customary and known constituents in effective amounts. Examples of suitable constituents are the crosslinking agents and additives described below, provided they are suitable for preparing adhesives.

In addition to the polyurethanes (B) of the invention and the graft copolymers 1 or 2 of the invention, the aqueous sealing compounds of the invention may likewise comprise further suitable customary and known constituents in effective amounts. Examples of suitable constituents are likewise the crosslinking agents and additives described below, provided they are suitable for preparing sealing compounds.

The primary dispersions of the graft copolymers 1 or 2 of the invention are especially suitable for preparing the aqueous coating materials of the invention, especially the aqueous paint materials of the invention. Examples of aqueous paint materials of the invention are surfacers, solid-color topcoats, aqueous basecoats, and clearcoats. The primary dispersions of the invention develop very particular advantages when used to prepare the aqueous basecoats of the invention.

In the aqueous basecoats of the invention, the polyurethanes (B) and/or the graft copolymers 1 and/or 2 of the invention, but especially the graft copolymers 1 and/or 2 of the invention, are present advantageously in an amount of from 1.0 to 50%, preferably from 2.0 to 40%, with particular preference from 3.0 to 30%, with very particular preference from 4.0 to 25%, and in particular from 5.0 to 20% by weight, based in each case on the overall weight of the respective aqueous basecoat of the invention.

The further essential constituent of the coating material, especially aqueous basecoat, of the invention is at least one crosslinking agent.

Examples of suitable crosslinking agents are amino resins, compounds or resins containing anhydride groups, compounds or resins containing epoxide groups, tris (alkoxycarbonylamino)triazines, compounds or resins containing carbonate groups, blocked and/or nonblocked polyisocyanates, beta-hydroxyalkylamides, and compounds containing on average at least two transesterifiable groups, examples being reaction products of malonic diesters and polyisocyanates or of esters and partial esters of polyhydric alcohols of malonic acid with monoisocyanates, such as described by European patent EP-A-0 596 460.

Crosslinking agents of this kind are well known to the skilled worker and are offered by numerous companies as commercial products.

Examples of suitable polyepoxides are, in particular, all known aliphatic and/or cycloaliphatic and/or aromatic polyepoxides, based for example on bisphenol A or bisphenol F. Examples of suitable polyepoxides also include the polyepoxides available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol® EX-512 (polyglycerol polyglycidyl ether), and Denacol® EX-521 (polyglycerol polyglycidyl ether).

The suitable tris (alkoxycarbonylamino)triazines had the following formula:

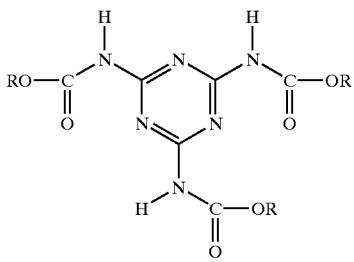

Examples of suitable tris(alkoxycarbonylamino)-triazines are described in patents U.S. Pat. No. 4,939,213, U.S. Pat. No. 5,084,541 or EP-A-0 624 577. In particular, the tris (methoxy-, tris(butoxy- and/or tris(2-ethylhexoxycarbonylamino)triazines are used.

The methyl butyl mixed esters, the butyl 2-ethylhexyl mixed esters, and the butyl esters are of advantage. They have the advantage over the straight methyl ester of better solubility in polymer melts, and also tend less toward crystallizing out.

One example of a suitable polyanhydride is polysuccinic anhydride.

Examples of suitable beta-hydroxyalkylamides are N,N,N',N'-tetrakis(2-hydroxyethyl)adipamide or N,N,N',N'-tetrakis(2-hydroxypropyl)adipamide.

Further examples of suitable crosslinking agents are the blocked polyisocyanates.

Examples of suitable blocking agents are the blocking agents known from the U.S. Pat. No. 4,444,954:

i) phenols such as phenol, cresol, xylenol, nitrophenol, chlorophenol, ethylphenyl, t-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dlchlorb-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzo phenone oxime or chlorohexanone oximes;

xiv) salts of sulfurous acids such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonates and acetoacetates or dimethylpyrazole and succinimide.

Examples of suitable organic polyisocyanates for blocking are in particular the polyisocyanates known as paint polyisocyanates, having aliphatically, cycloaliphatically, araliphatically and/or aromatically attached isocyanate groups. Preference is given to polyisocyanates containing from 2 to 5 isocyanate groups per molecule and having viscosities of from 100 to 10 000, preferably from 100 to 5 000. Furthermore, the polyisocyanates may have been conventionally hydrophilically or hydrophobically modified.

Further examples of suitable polyisocyanates for blocking are described in "Methoden der organischen Chemie", Houben-Weyl, Volume 14/2, 4$^{th}$ edition, Georg Thieme Verlag, Stuttgart 1963, pages 61 to 70, and by W. Siefken, Liebigs Annalen der Chemie, Volume 562, pages 75 to 136. Examples of those suitable are the polyurethane prepolymers which contain isocyanate groups, which can be prepared by reacting polyols with an excess of polyisocyanates, and are preferably of low viscosity.

Further examples of suitable polyisocyanates for blocking include polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, dicyclohexylmethane-2,4'-diisocyanate, dicyclohexylmethane 4,4'-diisocyanate, diisocyanates derived from dimeric fatty acids, such as are sold under the commercial designation DDI 1410 by Henkel and described in patents DO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane or mixtures of these polyisocyanates.

Very particular preference is given to using mixtures of polyisocyanates which contain uretdione and/or isocyanurate and/or allophanate groups and are based on hexamethylene diisocyanate, such as are formed by catalytic oligomerization of hexamethylene diisocyanate using appropriate catalysts.

In particular it is possible to use amino resins, examples being melamine resins, guanamine resins or urea resins, as crosslinking agents. In this context it is possible to use any amino resin which is suitable for transparent topcoat materials or clearcoat materials, or a mixture of such amino resins. For further details, refer to Römpp Lexikon Lacke und Druckfarben, Georg Thieme Verlag, 1998, page 29, "amino resins", and the text book "Lackadditive" [Additives for coatings] by Johan Bieleman, Wiley-VCH, Weinheim, N.Y., 1998, pages 242 ff., or to the book "Paints, Coatings and Solvents", second completely revised edition, edited by D. Stoye and W. Freitag, Wiley-VCH, Weinheim, N.Y., 1998, pages 80 ff. Also suitable, furthermore, are the customary and known amino resins some of whose methylol and/or methoxymethyl groups have been defunctionalized by means of carbamate or allophanate groups. Crosslinking agents of this kind are described in patents U.S. Pat. No. 4 710 542 and EP-B-0 245 700 and also in the article by B. Singh and coworkers "Carbamylmethylated Melamines, Novel Crosslinkers for the Coatings Industry" in Advanced Organic Coatings Science and Technology Series, 1991, Volume 13, pages 193 to 207.

The amino resins are preferably contained as the predominant or sole crosslinking agents in the aqueous basecoat materials of the invention. The abovementioned crosslinking agents may be used as additional crosslinking agents for further advantageous variation in the profile of properties of the aqueous basecoat materials of the invention and of the basecoats of the invention and multicoat color and/or effect paint systems of the invention that are produced from them, the fraction of the crosslinking agents therein being<50% by weight.

In the aqueous basecoat materials of the invention the crosslinking agents are employed preferably in an amount of from 0.1 to 30%, more preferably from 0.3 to 20%, with particular preference from 0.5 to 10%, and in particular from 1.0 to 8.0% by weight, based in each case on the overall weight of the respective aqueous basecoat material of the invention.

Yet a further essential constituent of the aqueous basecoat material of the invention is at least one color and/or effect pigment. The pigments may consist of organic or inorganic compounds. On the basis of this large number of suitable pigments, therefore, the aqueous basecoat material of the invention ensures a universal scope for use and permits the realization of a large number of color shades and optical effects.

Effect pigments which can be used include metal flake pigments such as commerical aluminum bronzes, the chromated aluminum bronzes of DE-A-36 36 183, commercial stainless steel bronzes, and nonmetallic effect pigments, such as pearlescent pigments and interference pigments, for example. For further details refer to Römpp Lexikon Lacke und Druckfarben, Georg Thieme Verlag, 1998, page 176, "Effect pigments" and pages 380 and 381 "Metal oxide-mica pigments" to "Metal pigments".

Examples of suitable inorganic color pigments are titanium dioxide, iron oxides, Sicotrans yellow, and carbon black. Examples of suitable organic color pigments are thioindigo pigments indanthrene blue, Cromophthal red, Irgazine orange and Heliogene green. For further details refer to Römpp Lexikon Lacke und Druckfarben, Georg Thieme Verlag, 1998, pages 180 and 181, "Iron blue pigments" to "Black iron oxides", pages 451 to 453 "Pigments" to "Pigment volume concentration", page 563 "Thioindigo pigments" and page 567 "Titanium dioxide pigments".

The fraction of the pigments in the aqueous basecoat material of the invention may vary extremely widely and is guided in particular by the opacity of the pigments, the desired shade, and the desired optical effect. In the aqueous basecoat material of the invention the pigments are present in an amount of preferably from 0.5 to 50%, more preferably from 0.5 to 45%, with particular preference from 0.5 to 40%, with very particular preference from 0.5 to 35%, and in particular from 0.5 to 30% by weight, based in each case on the overall weight of the aqueous basecoat material of the invention. The pigment/binder ratio, i.e., the ratio of the pigments to the polyurethanes (B) of the invention and/or to the graft copolymers 1 and/or 2 of the invention, and also any other binders that may be present, may vary extremely widely. This ratio is preferably from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

These pigments may also be incorporated into the aqueous basecoat materials of the invention by way of pigment pastes, in which case suitable grinding resins include the polyurethanes (B) of the invention and/or the graft copolymers 1 and/or 2 of the invention.

In addition to the constituents described above, the aqueous basecoat material of the invention may comprise customary and known additives in effective amounts.

Examples of suitable additives are organic and inorganic fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details refer to Rompp Lexikon Lacke und Druckfarben, Georg Thieme Verlag, 1998, pages 250 ff., "Fillers";

customary and known oligomeric and polymeric binders such as thermally curable, linear and/or branched and/ or block, comb and/or random poly(meth)acrylates or acrylic copolymers, especially those described in patent DE-A-197 36 535, polyesters, especially those described in patents DE-A-40 09 858 or DE-A-44 37 535, alkyds, acrylated polyesters, polylactones, polycarbonates, polyethers, epoxy resin-amine adducts, (meth)acrylate diols, partially saponified polyvinyl esters, polyurethanes, and acrylated polyurethanes, such as those described in patents EP-A-0 521 928, EP-A-0 522 420, EP-A-0 522 419, EP-A-0 730 613 or DE-A-44 37 535, or polyureas;

customary and known thermally curable reactive diluents such as positionally isomeric diethyloctanediols or hydroxyl-containing hyperbranched compounds or dendrimers;

low-boiling and/or high-boiling organic solvents ("long solvents");

UV absorbers;

light stabilizers such as HALS compounds, benzotriazoles or oxalanilides;

free-radical scavengers;

thermally labile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers;

crosslinking catalysts such as dibutyltin dilaurate, lithium decanoate or zinc octoate, or amine-blocked organic sulfonic acids;

devolatilizers such as diazadicycloundecane;

slip additives;

polymerization inhibitors;

defoamers;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;

wetting agents such as siloxanes, fluorous compounds, carboxylic monoesters, phosphates, polyacrylic acids and their copolymers, or polyurethanes;

adhesion promoters such as tricyclodecanedimethanol;

leveling agents;

film-forming auxiliaries such as cellulose derivatives;

transparent fillers based on silica, alumina or zirconium oxide; for further details refer to Römpp Lexikon Lacke und Druckfarben, Georg Thieme Verlag, Stuttgart, 1998, pages 250 to 252;

rheology control additives, such as those. known from patents WO 94/22968, EP-A-0 276 501, EP-A-0 249 201 or WO 97/12945; crosslinked polymeric microparticles, as disclosed for example in EP-A-0 008 127; inorganic phyllosilicates, preferably smectites, especially montmorillonites and hectorites, such as aluminum-magnesium silicates, sodium-magnesium and sodium-magnesium-fluorine-lithium phyllosilicates of the montmorillonite type or inorganic phyllosilicates such as aluminum-magnesium silicates, sodium-magnesium and sodium-magnesium-fluorine-lithium phyllosilicates of the montmorillonite type (for further details refer to the book by Johan Bielemann, "Lackadditive", Wiley-VCH, Weinheim, N.Y., 1998, pages 17 to 30); silicas such as Aerosils; or synthetic polymers containing ionic and/or associative groups such as polyvinyl alcohol, poly(meth)acrylamide, poly (meth)acrylic acid, polyvinylpyrrolidone, styrene-maleic anhydride or ethylene-maleic anhydride copolymers and their derivatives or hydrophobically modified polyacrylates; or associative thickeners based on polyurethane, as described in Römpp Lexikon Lacke und Druckfarben, Georg Thieme Verlag, Stuttgart, N.Y., 1998, "Thickeners", pages 599 to 600, and in the textbook "Lackadditive" by Johan Bieleman, Wiley-VCH, Weinheim, N.Y., 1998 pages 51 to 59 and 65; and/or flame retardants.

Further examples of suitable coatings additives are described in the textbook "Lackadditive" by Johan Bieleman, Wiley-VCH, Weinheim, N.Y., 1998.

The aqueous basecoat materials of the invention preferably have at spray viscosity a solids content of from 5.0 to 60%, more preferably from 5.0 to 50%, with particular preference from 10 to 45%, very particular preference from 13 to 40% and in particular from 13 to 35% by weight, based in each case on the overall weight of the respective aqueous basecoat material of the invention.

The preparation of the aqueous basecoat material of the invention has no special features but instead takes place in a customary and known manner by mixing of the above-described constituents in appropriate mixing equipment such as stirred tanks, dissolvers or extruders in accordance with the techniques suitable for preparing the respective aqueous basecoat materials.

The aqueous basecoat materials of the invention is used to produce the surface coatings of the invention, especially multicoat paint systems, on primed or unprimed substrates.

Suitable substrates are all surfaces for coating which are not damaged by curing of the coatings present thereon using heat; they are, for example, moldings of the invention, films and fibers, metals, plastics, wood, ceramic, stone, textile, fiber assemblies, leather, glass, glass fibers, glass wool and rock wool, mineral-bound and resin-bound building materials, such as plasterboards and cement boards or roof tiles, and composites of these materials. Accordingly, the paint system of the invention is also suitable for applications outside that of vehicle finishing, especially automobile finishing. In this context it is particularly suitable for the coating of furniture and for industrial coating, including coil coating, container coating, and the impregnation or coating of electrical components. In the context of industrial coatings it is suitable for coating virtually all parts for domestic or industrial use, such as radiators, domestic appliances, small metal parts such as screws and nuts, hubcaps, wheel rims, packaging, or electrical components such as motor windings or transformer windings.

In the case of electrically conductive substrates it is possible to use primers, which are produced in a customary and known manner from electrodeposition coating materials. Both anodic and cathodic electrodeposition coating materials are suitable for this purpose, but especially cathodics.

With the multicoat paint system of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1). The plastics for coating may of course also be polymer blends, modified plastics or fiber-reinforced plastics. The plastics normally used in constructing vehicles, especially motor vehicles, can also be used.

In the case of unfunctionalized and/or apolar substrate surfaces, these may be subjected prior to coating in a known manner to a pretreatment, such as with a plasma or by flaming, or may be provided with a water-based primer.

The multicoat paint systems of the invention may be produced in a variety of ways.

A first preferred variant of the process of the invention comprises the following process steps:

(I) preparing a basecoat film by applying the aqueous basecoat material of the invention to the substrate, (II) drying the basecoat film, (III) preparing a clearcoat film by applying a clearcoat material to the basecoat film, and (IV) jointly curing the basecoat film and the clearcoat film, to give the basecoat and the clearcoat (wet-on-wet technique).

This variant offers particular advantages especially in the context of the coating of plastics, and is therefore employed with particular preference in that utility.

A second preferred variant of the process of the invention comprises the following process steps:

(I) preparing a surfacer film by applying a surfacer to the substrate, (II) curing the surfacer film, to give the surfacer coat, (III) preparing a basecoat film by applying the aqueous basecoat material of the invention to the surfacer coat, (IV) drying the basecoat film, (V) preparing a clearcoat film by applying a clearcoat material to the basecoat film, and (VI) jointly curing the basecoat film and the clearcoat film, to give the basecoat and the clearcoat (wet-on-wet technique).

A third preferred variant of the process of the invention comprises the following process steps:

(I) preparing a surfacer film by applying a surfacer to the substrate, (II) drying the surfacer film, (III) preparing a basecoat film by applying the aqueous basecoat material of the invention to the surfacer film, (IV) drying the basecoat film, (V) preparing a clearcoat film by applying a clearcoat material to the basecoat film, and (VI) jointly curing the surfacer film, the basecoat film and the clearcoat film, to give the surfacer, the basecoat and the clearcoat (extended wet-on-wet technique).

The two last-mentioned variants offer particular advantages especially in the context of the coating of automobile bodies and are therefore employed with very particular preference in that utility.

Another special advantage of the aqueous basecoat material of the invention and of the process of the invention proves to be that the aqueous basecoat of the invention can be combined with all customary and known clearcoat materials in the context of the process of the invention.

Examples of suitable known one-component (1K), two-component (2K) or multicomponent (3K, 4K) clearcoat materials are known from patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

One-component (1K) clearcoat materials comprise, as is known, hydroxyl-containing binders and crosslinking agents such as blocked polyisocyanates, tris(alkoxycarbonylamino) triazines and/or amino resins. In a further variant they contain as binders polymers containing pendant carbamate and/or allophanate groups, and carbamate- and/or allophanate-modified amino resins as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

The essential constituents present in two-component (2K) or multicomponent (3K, 4K) clearcoat materials are known to be hydroxyl-containing binders and polyisocyanate crosslinking agents, which are stored separately up until they are used.

Examples of suitable powder clearcoat materials are, for example, known from German patent DE-A-42 22 194 or from the BASF Lacke+Farbe AG product information bulletin "Pulverlacke", 1990.

Powder clearcoat materials include as their essential constituents, as is known, binders containing epoxide groups and polycarboxylic acid crosslinking agents.

Examples of suitable powder slurry clearcoat materials are known, for example, from U.S. Pat. No. 4,268,542, international patent application WO 96/32452, and German patent applications DE-A-195 18 392.4 and DE-A-196 13 547, or are described in German patent application DE-A-198 14 471.7, unpublished at the priority date of the present specification.

Powder slurry clearcoat materials comprise, as is known, power clearcoat materials in dispersion in an aqueous medium.

UV-curable clearcoat materials are disclosed, for example, in patents EP-A-0 540 884, EP-A-0 568 967 or U.S. Pat. No. 4,675,234.

Powder slurry clearcoat materials offer particular advantages for the multicoat color and/or effect paint system of the invention and are therefore used with particular preference in accordance with the invention.

Furthermore, the clearcoats may additionally be coated further with at least one other clearcoat, for example, an organically modified ceramic layer, thereby making it possible to improve significantly the mar resistance of the multicoat paint system of the invention.

Accordingly, the multicoat paint systems of the invention may also vary in their structure.

In a first preferred variant of the multicoat paint system of the invention, (1) the color and/or effect basecoat and (2) a clearcoat lie above one another in the stated sequence. This preferred variant is employed in particular in the context of coating plastics.

In a second preferred variant of the multicoat paint system of the invention, (1) a surfacer coat which absorbs mechanical energy, (2) the color and/or effect basecoat, and (3) a clearcoat lie above one another in the stated sequence.

The aqueous basecoat material of the invention may be applied by all customary application methods, such as spraying, knifecoating, brushing, flowcoating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray applications such as hot-air spraying, for example. Application may be conducted-at temperatures of max. 70 to 80° C., so that suitable application viscosities are achieved without the short-term thermal stress being accompanied by any change in or damage to the aqueous basecoat material and its overspray, which may be intended for reprocessing. For instance, hot spraying may be configured such that the aqueous basecoat material is heated in the spray nozzle for only a very short time, or is heated just a short way upstream of the spray nozzle.

The spray booth used for the application may be operated, for example, with an optionally temperature-controllable circulation, which is operated with an appropriate absorption medium for the overspray, an example being the aqueous basecoat material itself.

In general, the surfacer film, basecoat film and clearcoat film are applied in a wet film thickness such that they cure to give coats having the coat thicknesses which are necessary and advantageous for their functions. In the case of the surfacer coat, this coat thickness is from 10 to 150, preferably from 10 to 120, with particular preference from 10 to 100, and in particular from 10 to 90 $\mu$m; in the case of the basecoat it is from 5 to 50, preferably from 5 to 40, with particular preference from 5 to 30, and in particular from 10 to 25 $\mu$m; and in the case of the clearcoats it is from 10 to 100, preferably from 15 to 80, with particular preference from 20 to 70, and in particular from 25 to 60 $\mu$m.

The surfacer film, basecoat film and clearcoat film are cured thermally.

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application of elevated temperatures of up to 90° C. and/or by a reduced atmospheric humidity <10 g water/kg air, particularly <5 g/kg air, provided no damage or alteration to the paint films occurs in this case, such as premature complete crosslinking.

The thermal cure has no special features in terms of its method but instead takes place in accordance with the customary and known methods such as heating in a convection oven or exposure to IR lamps. This thermal cure may also take place in stages. The thermal cure takes place advantageously at a temperature of from 50 to 100° C., with particular preference 80 to 100° C., and in particular 90 to 100° C. for a period of from 1 min up to 2 h, with particular preference from 2 min up to 1 h, and in particular from 3 min to 30 min. Where substrates are used which have high thermal load bearing capacities, thermal crosslinking may also be conducted at temperatures above 100° C. In this case it is generally advisable not to exceed temperatures of 180° C., preferably 160° C., and in particular 155° C.

In the case of the clearcoats, curing may also take place with actinic radiation or both thermally and with actinic radiation (dual cure), depending on the clearcoat material used. Suitable actinic radiation is electromagnetic radiation such as near infrared (NIR) light, visible light, UV radiation or x-rays and/or corpuscular radiation such as electron beams.

The multicoat paint systems of the invention exhibit an outstanding profile of properties which is very well balanced in terms of mechanics, optics, corrosion resistance, and adhesion. Thus the multicoat paint systems of the invention possess the high optical quality and intercoat adhesion required by the market and do not give rise to any problems such as deficient surfacer condensation resistance, basecoat cracking (mudcracking), or leveling defects or surface textures in the clearcoats.

In particular, the multicoat paint systems of the invention exhibit an outstanding metallic effect, an excellent D.O.I. (distinctiveness of the reflected image), and an outstanding surface smoothness. They are weathering-stable, resistant to chemicals and bird droppings, are mar resistant, and exhibit very good reflow behavior.

Not least, however, it proves to be a very special advantage that through the use of the aqueous basecoat materials of the invention in the production of the multicoat paint systems of the invention no cracking or popping marks result even when the aqueous basecoat films are overcoated with powder slurry clearcoat materials and subsequently baked together with them. By this means it is possible to combine the particular advantages of aqueous basecoat materials with the particular advantages of powder slurry clearcoat materials. Moreover, these very multicoat paint systems of the invention prove to be particularly firmly adhering, even when used as refinishes.

Accordingly, the substrates coated with them also have particular advantages such as longer service life, a better aesthetic impression for the viewer, and a better technological usefulness, so making them particularly attractive economically and better particularly for the OEM finishing of automobiles.

EXAMPLES AND COMPARATIVE EXPERIMENTS

Preparation Example 1

The preparation of an Adduct (B2) for Inventive use

A reaction vessel equipped with stirrer, internal thermometer, reflux condenser and electrical heating was charged with 429 parts by weight of methyl ethyl ketone, 182 parts by weight of N-methylpyrrolidone and 210 parts by weight of diethanolamine at 20 degrees Celsius. Added to this mixture over the course of one and a half hours were 42 parts by weight of 1-(1-isocyanato-1-methylethyl)-3-(1-methylethenyl)benzene (TMI® from CYTEC), dropwise in such a way that the reaction temperature did not exceed 40 degrees Celsius. The resulting reaction mixture was stirred until free isocyanate groups were no longer detectable. It was then stabilized with 200 ppm of hydroquinone. The solids content of the reaction mixture was 50% by weight.

Example 1

The Preparation of an Inventive Polyurethane (B)

In a reaction vessel equipped with stirrer, internal thermometer, reflux condenser and electrical heating, 664.4 parts by weight of a linear polyester polyol (prepared from dimerized fatty acid (Pripol® 1013), isophthalic acid and 1,6-hexanediol) having a hydroxyl number of 80 and a number-average molecular weight of 1400 daltons and 89.4 parts by weight of dimethylolpropionic acid were dissolved in 342 parts by weight of methyl ethyl ketone and 52 parts by weight of N-methylpyrrolidone. 296.2 parts by weight of isophorone diisocyanate were added to the resulting solution at 45 degrees Celsius. After the exothermic reaction had subsided, the reaction mixture was slowly heated to 80 degrees Celsius with stirring. It was stirred further at this temperature until the isocyanate content remained constant at 1.2% by weight. The reaction mixture was then cooled to 70 degrees Celsius and 248 parts by weight of the adduct (B2) in preparation example 1 were added. The resulting reaction mixture was stirred at 70 degrees Celsius until free isocyanate groups were no longer detectable. The resulting dissolved polyurethane (B) was admixed with 142 parts by weight of methoxypropanol and 57 parts by weight of triethylamine. 30 minutes after adding the amine, the solution was lowered in temperature to 60 degrees Celsius, and then 1791 parts by weight of deionized water were added with stirring over the course of 30 minutes. The methyl ethyl ketone was removed from the resulting dispersion by distillation under reduced pressure at 60 degrees Celsius. Thereafter, any losses of solvent and of water were compensated. The resultant dispersion of the polyurethane (B) of the invention had a solids content of 35.1% by weight (one hour at 130 degrees Celsius) and a pH of 7.3.

Example 2

The preparation of the Primary Dispersion of an Inventive Graft Copolymer 1

1495.7 parts by weight of the polyurethane dispersion (B) from example 1 were diluted with 851.6 parts by weight of deionized water and heated to 85 degrees Celsius. At this temperature, a mixture of 150.2 parts by weight of styrene, 150.2 parts by weight of methyl methacrylate, 112.4 parts by weight of n-butyl acrylate and 112.4 parts by weight of hydroxyethyl methacrylate were added to the dispersion at a uniform rate over the course of 3.5 hours with stirring. At the same time as commencing the addition of the monomer mixture, a solution of 7.9 parts by weight of tert-butyl peroxyethylhexanoate in 115.5 parts by weight of methoxypropanol was added over the course of four hours. The resulting reaction mixture was stirred at 85 degrees Celsius until all of the monomers had reacted. The resulting primary dispersion of the graft copolymer 1 had a very good storage stability. Its solid content was 34.9% by weight (one hour at 130 degrees Celsius) and its pH was 7.3.

Comparative Experiment C1

The Preparation of a Known Polyurethane Containing Ethenylarylene Groups

A hydroxyl-containing polyester was prepared in accordance with the intermediate A in patent EP-A-0 608 021, page 6 lines 22 to 37. For this purpose, a mixture of 236 parts by weight of 1,6-hexanediol, 208 parts by weight of neopentyl glycol, 616 parts by weight of hexahydrophthalic anhydride and 6 parts by weight of benzyltriphenylphosphonium chloride was charged to an appropriate reaction vessel and heated to 120 degrees Celsius under nitrogen and with stirring. After one hour at this temperature, the reaction mixture was heated to 140 degrees Celsius. Subsequently, 1000 parts by weight of the glycidyl ester of 1,1-dimethyl-1-heptanecarboxylic acid (Cardura® E-10 from Shell) were metered in over two hours. After four hours, the reaction mixture had an acid number of 8.5 mg KOH/g. A further 80 parts by weight of Cardura® E-10 were added. After another two hours, the acid number of the reaction mixture was less than 1 mg KOH/g.

In accordance with the instructions given on page 7 lines 1 to 27 (Example I) of patent EP-A-0 608 021, 261.6 parts by weight of the above-described polyester, 55 parts by weight of N-methyl-pyrrolidone and 0.1 part by weight of dibutyltin diacetate were taken as initial charge. 72.1 parts by weight of isophorone diisocyanate were metered into this mixture over the course of one hour at 90 degrees Celsius. After two hours at 90 degrees Celsius, the reaction mixture was heated to 100 degrees Celsius. At this temperature, 16.3 parts by weight of 1-(1-isocyanato-1-methylethyl)-3-(1-methylethenyl)benzene (TMI® from CYTEC) were metered in over 15 minutes. The resulting reaction mixture was held at 100° C. for one hour.

Thereafter, the reaction mixture was heated to 130 degrees Celsius and at this temperature a mixture of 38.2 parts by weight of styrene, 9.2 parts by weight of methyl methacrylate, 33.1 parts by weight of acrylic acid, 66 parts by weight of Cardura® E-10, 2.7 parts by weight of dicumyl peroxide, 0.8 parts by weight of 3-mercaptopropionic acid and 51.9 parts by weight of 2-butoxyethanol was added over the course of one hour under nitrogen and with stirring. The resulting reaction mixture was held at this temperature for three hours. Subsequently, at 115 degrees Celsius, 18.1 parts by weight of dimethylethanolamine were metered in. After the mixture had cooled to 90 degrees Celsius, 782 parts by weight of deionized water were metered in dropwise with stirring over three hours, giving a secondary dispersion having a solids content of 35.8% by weight.

Example 2 and Comparative Experiments C2 and C3

The Preparation of an Inventive Aqueous Basecoat Material (Example 1) and Noninventive Aqueous Basecoat Materials (Comparative Experiments C2 and C3)

For the inventive example 2, 9.5 parts by weight of deionized water were charged to a mixing vessel. With stirring, 10.5 parts by weight of an aqueous acrylate dispersion [component (i) in accordance with patent DE-A-197 36 535; Acronal® 290 D from BASF Aktiengesellschaft], 13.5 parts by weight of the inventive primary dispersion of example 1, 10.4 parts by weight of the thickener 1 (paste of a synthetic sodium magnesium phyllosilicate from Laporte, 3% in water), 8.0 parts by weight of deionized water, 0.28 parts by weight of a 15% strength aqueous ammonia solution and 18.0 parts by weight of the thickener 2 (3% strength aqueous solution of a polyacrylic acid thickener from Allied Colloids) were added.

Subsequently, with stirring, 4.2 parts by weight of a pigment paste having a carbon black content of 10% by weight and containing 60% by weight of the acrylated polyurethane dispersion in accordance with Example D of patent DE-A-44 37 535, 10.2 parts by weight of a filler paste having an Aerosil content of 10% by weight and containing 50% by weight of the acrylated polyurethane dispersion in accordance with Example D of patent DE-A-44 37 535, 2.0 parts by weight of butyl glycol and 3.5 parts by weight of a methanol- and butanol-etherified melamine resin from CYTEC were added.

In a separate mixing vessel, a mixture of 0.4 parts by weight of a commercial aluminum bronze (AluStapa Hydrolux® from Eckart, Al content 65% by weight) and 0.6 parts by weight of butyl glycol was stirred together. This mixture was subsequently added in portions and with vigorous stirring to the other mixture.

In a further separate mixer, 1.3 parts by weight of a pearlescent pigment (Iriodin® 9103 Sterling Silber WR from Merck) and 2.3 parts by weight of butyl glycol were mixed. This mixture was subsequently added in portions, again with vigorous stirring, to the mixture described above.

Table 1 gives an overview of the composition of the inventive aqueous basecoat material of example 2.

For comparative experiment C2, example 2 was repeated but replacing the inventive primary dispersion of example 1 by the aqueous polyurethane resin dispersion of example 1 of patent DE-A-43 39 870 [component (ii)].

For comparative experiment C3, example 2 was repeated but replacing the inventive primary dispersion of example 1 by the known secondary dispersion of comparative experiment C1.

The material composition of the noninventive aqueous basecoat materials C3 and C2 is likewise given in table 1.

TABLE 1

The composition of the inventive aqueous basecoat material (example 2) and of the noninventive aqueous basecoat materials (comparative experiments C2 and C3)

| Constituents | Comparative experiments: C2 | C3 | Example: 2 |
|---|---|---|---|
| Deionized water | 9.5 | 9.5 | 9.5 |
| Component (i) | 10.5 | 10.5 | 10.5 |
| Component (ii) | 13.5 | — | — |
| Secondary dispersion C1 | — | 13.5 | — |
| Primary dispersion 1 | — | — | 13.5 |
| Thickener 1 | 10.4 | 10.4 | 10.4 |
| Deionized water | 8.0 | 8.0 | 8.0 |
| Ammonia solution | 0.28 | 0.28 | 0.28 |
| Thickener 2 | 18.0 | 18.0 | 18.0 |
| Pigment paste | 4.2 | 4.2 | 4.2 |
| Filler paste | 10.2 | 10.2 | 10.2 |
| Butyl glycol | 2.0 | 2.0 | 2.0 |
| Melamine resin | 3.5 | 3.5 | 3.5 |
| Aluminum paste | 0.4 | 0.4 | 0.4 |
| Butyl glycol | 0.6 | 0.6 | 0.6 |
| Iriodin 9103 | 1.3 | 1.3 | 1.3 |
| Butyl glycol | 2.3 | 2.3 | 2.3 |

The viscosity of the aqueous basecoat materials of table 1 was adjusted using deionized water to from 90 to 95 mPas at a shear rate of 1000/s.

Example 3 and Comparative Experiments C4 and C5

The Preparation of an Inventive Multicoat Paint System (Example 3) and of Noninventive Multicoat Paint Systems (Comparative Experiments C4 and C5)

The inventive multicoat paint system of example was prepared using the inventive aqueous basecoat material of example 2 (cf. table 1).

The noninventive multicoat paint system of comparative experiment C4 was prepared using the noninventive aqueous basecoat material of comparative experiment C2 (cf. table 1).

The noninventive multicoat paint system of comparative experiment C5 was prepared using the noninventive aqueous basecoat material of comparative experiment C3 (cf. table 1).

A. The Preparation of the Test Panels

For example 3 and the comparative experiments C4 and C5, test panels were first of all prepared. This was done by coating steel panels (bodywork panels), which had been coated with a customary and known cathodically deposited and baked electrodeposition coating, with a commercial thin-film surfacer (Ecoprime® 60 from BASF Coatings AG; anthracite-colored), after which the resulting surfacer film was flashed off at 20 degrees Celsius and a relative atmospheric humidity of 65% for five minutes and dried at 80 degrees Celsius in a convection oven for five minutes. Subsequently, the surfacer film had a dry film thickness of 15 μm.

Following the cooling of the test panels to 20 degrees Celsius, the aqueous basecoat materials of table 1 were applied, flashed off at 20 degrees Celsius and a relative atmospheric humidity of 65% for five minutes and dried at 80 degrees Celsius in a convection oven for five minutes, so that the dried basecoat films had a dry film thickness of approximately 15 μm.

After the test panels had again been cooled to 20° C., the basecoat films were overcoated with a powder slurry clearcoat material in accordance with international patent application WO 96/32452. The resulting powder slurry clearcoat films were flashed off at 20 degrees Celsius and a relative atmospheric humidity of 65% for 30 minutes, and dried at 55 degrees Celsius in a convection oven for five minutes. The dry film thickness of the resulting clearcoat films was from 50 to 60 μm.

Following the application of all three films, they were baked jointly at 155 degrees Celsius for 30 minutes, to give the inventive multicoat paint system of example 3 and the noninventive multicoat paint systems of the comparative experiments C4 and C5.

B. The Production of Refinish Coats

To simulate the refinishing of the entire body on the line (line refinish), the test panels from example 3 and from the comparative experiments C4 and C5 were sanded with a 1200 grit sandpaper and, in accordance with the instructions described above, were coated again with the same multicoat paint system in each case (double coating).

C. The Determination of the Popping Limit and Cracking Limit (mud Cracking)

In accordance with the instructions given in section A. above, multicoat paint systems were produced in which the basecoats were applied in a wedge from 3 to 40 μm. The clearcoats had a coat thickness of from 55 to 57 μm. The cracking limit and popping limit indicate the coat thickness above which surface defects (in this case popping marks and mud cracking) appear in the clearcoat. The cracking limit and the popping limit are a measure of the compatibility of the aqueous basecoat material with the clearcoat material, or of the basecoat with the clearcoat; the higher the cracking limit or the popping limit, the better the compatibility. The corresponding results are given in table 2.

D. The Testing of the Clearcoat Adhesion

The clearcoat adhesion was tested on unstressed test panels [cf. section A. above (original finish) and section B. above (refinish)] after three days of storage at room temperature. For this purpose, using a knife or a pointed mandrel, the multicoat paint systems were scored down to the steel surface. The score marks were then subjected to a jet of water under high pressure for one minute (high-pressure cleaner from Kärcher), the water pressure being 230 bar, the water temperature 20 degrees Celsius, and the distance of the rotating spray nozzle from the test panels 6 cm. Assessment was made visually: if the multicoat paint system showed no damage, it was assessed as being "satisfactory" (sat.). If delamination occurred, this was assessed as being "unsatisfactory" (unsat.). The results are likewise given in table 2.

E. The Testing of the Intercoat Adhesion After Ball Shot Testing

Ball shot testing was carried out in accordance with the DaimlerChrysler specification, which is general knowledge among those skilled in the art. The corresponding results are likewise given in table 2.

F. The Testing of the Intercoat Adhesion After Constant Condensation Climate Exposure to DIN 50017:

The test panels produced in accordance with the instructions indicated in section A. were subjected to the constant condensation climate of DIN 50017. Subsequently, after 0 and 2 hours of regeneration, the intercoat adhesion was determined using the cross-cut test in accordance with DIN EN ISO 2409. The results are likewise given in table 2.

TABLE 2

The results of the tests of sections C. to F.

| Tests | Comparative experiments: C4 | C5 | Example: 3 |
|---|---|---|---|
| Section C.: | | | |
| Cracking limit (μm): | 28 | 12 | 36 |
| Popping limit (μm) | 23 | 13 | 29 |
| Section D.: | | | |
| Water jet test: | unsat.[1] | unsat.[1] | sat. |
| Section E.: | | | |
| Ball shot testing: | | | |
| Original finish | 6/0 | 12/0 | 6/0 |
| Refinish | 16/0 | 35/0 | 14/0 |
| Section F.: | | | |
| Cross-cut test: | | | |
| After 0 hours' regeneration | GT0 | GT3 | GT0 |
| After 2 hours' regeneration | GT0 | GT1–2 | GT0 |

[1]Extensive clearcoat delamination

The results of table 2 demonstrate that the inventive aqueous basecoat material of example 2 and the inventive multicoat paint system of example 3 were clearly superior to the noninventive aqueous basecoat materials of comparative experiments C2 and C3 and to the noninventive multicoat paint systems of comparative experiments C4 and C5 in terms of the-compatibility of aqueous basecoat material and powder slurry clearcoat material and in terms of the intercoat adhesion. Furthermore, they underscore the incompatibility of the noninventive aqueous basecoat material C3 with the powder slurry clearcoat material and the very poor individual chip resistance of the noninventive multicoat paint system C4 produced using it.

What is claimed is:

1. A polyurethane comprising hydrophilic functional groups and at least one ethenylarylene group, wherein the ethenylarylene group is at least one of pendant and terminal, and comprising a reaction product of
   (1) at least one polyurethane prepolymer containing at least one free isocyanate group, and
   (2) at least one adduct comprising a reaction product of, in a molar ratio of 1:1,
      (2.1) at least one ethenylarylene monoisocyanate, and
      (2.2) at least one of a polyol, a polyamine, and a compound containing at least one hydroxyl group and at least one amino group.

2. The polyurethane of claim 1, wherein the ethenylarylene monoisocyanate has the general formula I:

$$CH_2=C(R)-A-X-NCO \qquad (I)$$

wherein
   A is at least one of a substituted $C_6$–$C_{20}$ arylene radical and an unsubstituted $C_6$–$C_{20}$ arylene radical;
   R is at least one of a hydrogen atom, a halogen atom, a nitrite group, and a radical, wherein the radical is at least one of an alkyl, a cycloalkyl, an alkylcycloalkyl, a cycloalkylalkyl, an aryl, an alkylaryl, a cycloalkylaryl, an arylalkyl, and an arylcycloalkyl, and wherein the radical is one of substituted and unsubstituted; and
   X is a divalent organic radical.

3. The polyurethane of claim 2, wherein the arylene radical A is one of phenylene, naphthylene, or biphenylylene, and is one of substituted or unsubstiuted.

4. The polyurethane of claim 2, wherein the arylene radical A is at least one of 1,2-phenylene, 1,3-phenylene, and 1,4-phenylene.

5. The polyurethane of claim 2, wherein R is a hydrogen atom.

6. The polyurethane of claim 2, wherein the divalent organic radical X is a branched or unbranched $C_1$–$C_{10}$ alkanediyl radical.

7. The polyurethane of clam 6, wherein the divalent organic radical X is a branched or unbranched $C_3$–$C_6$ alkanediyl radical.

8. The polyurethane of claim 7, wherein the divalent organic radical X is —$C(CH_3)_2$—.

9. The polyurethane of claim 1, wherein at least one of the ethenylarylene monoisocyanates is 1-(1-isocyanato-1-methylethyl)-3-(1-methylethenyl)benzene.

10. A graft copolymer comprising a hydrophobic core and a hydrophilic shell, wherein one of
   i) the hydrophobic core comprises a (co)polymerization product of at least one olefinically unsaturated monomer and the hydrophilic shell comprises at least one polyurathane, or
   ii) the hydrophobic core comprises at least one polyurethane, and the hydrophilic shell comprises a (co)polymerization product of at least one olefinically unsaturated monomer
      wherein the graft copolymer is prepared by a process comprising
      1) dispersing at least one polyurethane in an aqueous medium, and
      2) subjecting at least one olefinically unsaturated monomer to radical (co)polymerization in emulsion in the presence of the at least one polyurethane,
         wherein the at least one polyurethane comprises at least one ethenylarylene group, wherein the ethenylarylene group is at least one of pendant and terminal, and comprises a reaction product of
         (1) at least one polyurethane prepolymer containing at least one free isocyanate group, and
         (2) at least one adduct comprising a reaction product of, in a molar ratio of 1:1,
            (2.1) at least one ethenylarylene monoisocyanate, and
            (2.2) at least one of a polyol, a polyamine, and a compound containing at least one hydroxyl group and at least one amino group.

11. The graft copolymer of claim, 10 wherein the ethenylarylene group has the general formula II:

$$CH_2=C(R)-A- \qquad (II)$$

wherein
   A is at least one of a substituted $C_6$–$C_{20}$ arylene radical and an unsubstituted $C_6$–$C_{20}$ arylene radical; and
   R is at least one of a hydrogen atom, a halogen atom, a nitride group, and a radical, wherein the radical is at least one of an alkyl, a cycloalkyl, an alkylcycloalkyl, a cycloalkylalkyl, an aryl, an alkylaryl, a cycloalkylaryl, an arylalkyl, and an arylcycloalkyl, and wherein the radical is one of substituted and unsubstituted.

12. The graft copolymer of claim 11, wherein the arylene radical A is one of phenylene, naphthylene, or biphenylylene, and is one of substituted or unsubstituted.

13. The graft copolymer of claim 11, wherein R is a hydrogen atom.

14. The graft copolymer of claim 11, wherein the arylene radical A is at least one of 1,2-phenylene, 1,3-phenylene, and 1,4-phenylene.

15. The graft copolymer of claim 10, wherein the ethenyarylene group is joined to the polyurethane main chain by way of a divalent or trivalent linking radical III containing at least one of a urethane group and a urea group.

16. The graft copolymer of claim 15, wherein the linking radical III comprises at least one group of general formula IIIa to IIIc $$-X-NH-C(O)-O- \qquad (IIIa),$$

$$-X-NH-C(O)-NH- \qquad (IIIb),$$

$$-X-NH-C(O)-N< \qquad (IIIc),$$

wherein X is a divalent organic radical.

17. The graft copolymer of claim 10, wherein the hydrophilic shell contains at least one of a carboxylic acid group and a carboxylate group.

18. The graft copolymer of claim 17, wherein the ratio of acid number of the shell to acid number of the core is greater than 1.

19. A graft copolymer comprising
   A) a hydrophobic core comprising a (co)polymerization product of at least one olefinically unsaturated monomer, and
   B) a hydrophilic shell comprising at least one polyurethane, wherein the graft copolymer is prepared by a process comprising
1) dispersing at least one hydrophilic olefinically unsaturated polyurethane in an aqueous medium, wherein the hydrophilic olefinically unsaturated polyurethane contains at least one pendant ethenylarylene group and optionally at least one terminal ethenylarylene group, and
2) subjecting at least one hydrophobic olefinically unsaturated monomer to radical (co)polymerization in emulsion in the presence of the polyurethane.

20. The graft copolymer of claim 19, wherein the hydrophilic polyurethane comprises a reaction product of
a) at least one oligomer or polymer containing
   1) at least one hydrophilic functional group and
   2) one of
      2.1) at least two hydroxyl groups,
      2.2) at least two amino groups, or
      2.3) at least one hydroxyl group and at least one amino group; and
b) at least one ethylenearylene monoisocyanate.

21. The graft copolymer of claim 20, wherein the at least one oligomer comprises at least one of a polyester and a polyurethane or the at least one polymer comprises at least one of a polyester and a polyurethane.

22. The graft copolymer of claim 19, wherein the ethenylarylene group has the general formula II:

$$CH_2=C(R)-A-\qquad (II)$$

wherein
A is at least one of a substituted $C_6$–$C_{20}$ arylene radical and an unsubstituted $C_6$–$C_{20}$ arylene radical; and
R is at least one of a hydrogen atom, a halogen atom, a nitrile group, and a radical, wherein the radical is at least one of an alkyl, a cycloalkyl, an alkylcycloalcyl, a cycloalkcylatkyl, an aryl, an alkylaryl, a cycloalkylaryl, an arylalkyl, and an arylcycloalkyl, and wherein the radical is one of substituted and unsubstituted.

23. The graft copolymer of claim 22, wherein the arylene radical A is one of phenylene, naphthylene, or biphenylylene, and is one of substituted or unsubstituted.

24. The graft copolymer of claim 22, wherein R is a hydrogen atom.

25. The graft copolymer of claim 22, wherein the arylene radical A is at least one of 1,2-phenylene, 1,3-phenylene, and 1,4-phenylene.

26. The graft copolymer of claim 19, wherein the ethenylarlene group is joined to the polyurethane main chain by way of a divalent or trivalent linking radical III containing at least one of a urethane group and a urea group.

27. The graft copolymer of claim 26, wherein the linking radical III comprises at least one group of general formula IIIa to IIIc $$-X-NH-C(O)-O-\qquad (III),$$
$$-X-NH-C(O)-NH-\qquad (IIIb),$$
$$-X-NH-C(O)-N<\qquad (IIIc),$$

wherein X is a divalent organic radical.

28. The graft copolymer of claim 19, wherein the hydrophilic shell contains at least one of a carboxylic acid group and a carboxylate group.

29. The graft copolymer of claim 28, wherein the ratio of acid number of the shell to acid number of the core is greater than 1.

30. A process comprising providing the polyurethane of claim 1 in one of a sealing compound, an adhesive compound, and a coating composition.

31. The process of claim 30 further comprising one of
i) forming a seal from the sealing compound on a substrate,
ii) forming an adhesive film from the adhesive compound on a substrate, and
iii) forming a coating from the coating composition on a substrate.

32. An article produced by the process of claim 31, wherein the article is one of a seal, an adhesive film, and a coating.

33. The substrate produced by the process of claim 31.

34. The substrate of claim 33, wherein the substrate is one of a molding, a foil, a fiber, a motor vehicle body, an industrial component, an electrical component, a coil, a package, and furniture.

35. A process comprising providing the graft copolymer of claim 10 in one of a sealing compound, an adhesive compound, and a coating composition.

36. The process of claim 35 further comprising one of
i) forming a seal from the sealing compound on a substrate,
ii) forming an adhesive film from the adhesive compound on a substrate, and
iii) forming a coating from the coating composition on a substrate.

37. An article produced by the process of claim 36, wherein the article is one of a seal, an adhesive film, and a coating.

38. The substrate produced by the process of claim 36.

39. The substrate of claim 38, wherein the substrate is one of a molding, a foil, a fiber, a motor vehicle body, an industrial component, an electrical component, a coil, a package, and furniture.

40. A process comprising providing the graft copolymer of claim 19, in one of a sealing compound, an adhesive compound, and a coating composition.

41. The process of claim 40 further comprising one of
i) forming a seal from the sealing compound on a substrate,
ii) forming an adhesive film from the adhesive compound on a substrate, and
iii) forming a coating from the coating composition on a substrate.

42. An article produced by the process of claim 41, wherein the article is one of a seal, an adhesive film, and a coating.

43. The substrate produced by the process of claim 41.

44. The substrate of claim 43, wherein the substrate is one of a molding, a foil, a fiber, a motor vehicle body, an industrial component, an electrical component, a coil, a package, and furniture.

45. A composition comprising the polyurethane of claim 1, wherein the composition is one of a sealing compound, an adhesive compound, and a coating composition.

46. A composition comprising the graft copolymer of claim 10, wherein the composition is one of a sealing compound, an adhesive compound, and a coating composition.

47. A composition comprising the graft copolymer of claim 19, wherein the composition is one of a sealing compound, an adhesive compound, and a coating composition.

* * * * *